US010699236B2

(12) United States Patent
Apte et al.

(10) Patent No.: US 10,699,236 B2
(45) Date of Patent: Jun. 30, 2020

(54) SYSTEM FOR STANDARDIZATION OF GOAL SETTING IN PERFORMANCE APPRAISAL PROCESS

(71) Applicant: Tata Consultancy Services Limited, Mumbai (IN)

(72) Inventors: Manoj Madhav Apte, Pune (IN); Sachin Pawar, Pune (IN); Girish Keshav Palshikar, Pune (IN); Sriram Baskaran, Pune (IN); Amol Madhukar Aaeer, Pune (IN); Deepak Pandita, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 354 days.

(21) Appl. No.: 15/295,637

(22) Filed: Oct. 17, 2016

(65) Prior Publication Data
US 2017/0109680 A1 Apr. 20, 2017

(30) Foreign Application Priority Data
Oct. 17, 2015 (IN) .......................... 3946/MUM/2015

(51) Int. Cl.
*G06Q 10/06* (2012.01)
(52) U.S. Cl.
CPC . *G06Q 10/06393* (2013.01); *G06Q 10/06398* (2013.01)
(58) Field of Classification Search
CPC ...................................................... G06Q 10/06
See application file for complete search history.

(56) References Cited

U.S. PATENT DOCUMENTS

| 7,827,050 B2 | 11/2010 | Bangel et al. |
| 8,811,727 B2 | 8/2014 | Mohamed |
| 2006/0184409 A1* | 8/2006 | Bangel .................. G06Q 10/06 705/7.42 |
| 2007/0239642 A1* | 10/2007 | Sindhwani ........... G06K 9/6269 706/25 |

(Continued)

FOREIGN PATENT DOCUMENTS

CN 103150572 A 8/2013

*Primary Examiner* — Susanna M. Diaz
*Assistant Examiner* — Sara Grace Brown
(74) *Attorney, Agent, or Firm* — Finnegan, Henderson, Farabow, Garrett & Dunner LLP

(57) ABSTRACT

This disclosure relates generally to performance appraisal management, and more particularly to standardization of goals associated with performance appraisal. In one embodiment, a method for standardization of goals includes identifying labeled and unlabeled goals associated with a role. The goals includes template and manually created goals. Each of the template goals is associated with a class label, and includes corresponding goal description and self-comments. First and second classifiers are trained using goal description and self-comments. Candidate negative goals are identified and excluded from the goals to obtain a set of unlabeled goals. The set of unlabeled goals are classified by the first and second classifier, and a confidence score associated with the classification is determined. The unlabeled goals with high confidence score are added to labeled goals to obtain an updated set of labeled goals. The first and second classifiers are iteratively co-trained using the updated set of labeled goals.

13 Claims, 10 Drawing Sheets

(56) References Cited

U.S. PATENT DOCUMENTS

| | | | | |
|---|---|---|---|---|
| 2007/0282872 | A1* | 12/2007 | Probst | G06F 17/241 |
| 2011/0103682 | A1 | 5/2011 | Chidlovskii et al. | |
| 2011/0119209 | A1* | 5/2011 | Kirshenbaum | G06N 5/02 |
| | | | | 706/12 |
| 2012/0179633 | A1* | 7/2012 | Ghani | G06F 17/30705 |
| | | | | 706/12 |
| 2014/0129560 | A1* | 5/2014 | Grokop | G06N 5/043 |
| | | | | 707/737 |
| 2016/0162576 | A1* | 6/2016 | Arino de la Rubia | |
| | | | | G06F 17/2765 |
| | | | | 707/739 |
| 2016/0203209 | A1* | 7/2016 | Clinchant | G06F 17/30707 |
| | | | | 707/738 |
| 2016/0253597 | A1* | 9/2016 | Bhatt | G06N 99/005 |
| | | | | 706/12 |
| 2016/0321935 | A1* | 11/2016 | Mohler | G06Q 10/06 |

\* cited by examiner

```
   Data: T (Set of template goals), N (Set of manually
         created goals), α (Weight given to V₁, lies
         between 0 and 1 with default value = 0.6), θ
         (Similarity threshold on cosine similarity with
         default value = 0.2)
   Result: N_neg (Set of manually created goals which are
         candidates for negative (NONE) class)
 1 WV₁ := [];    /* Empty mappings with key = goal and
   value = word vector using V₁ */
 2 WV₂ := [];    /* Empty mappings with key = goal and
   value = word vector using V₂ */
 3 foreach g ∈ T ∪ N do
 4  |  WV₁[g] := TF-IDF word vector using goal
   |  description of g;
 5  |  WV₂[g] := TF-IDF word vector using self comments
   |  for g;
 6 end
 7 foreach g ∈ N do
 8  |  S_max := 0;
 9  |  foreach g' ∈ T do
10  |   |  sim₁ := CosineSim(WV₁[g], WV₁[g']);
11  |   |  sim₂ := CosineSim(WV₂[g], WV₂[g']);
12  |   |  sim := α · sim₁ + (1 − α) · sim₂;
13  |   |  if sim > S_max then S_max := sim
14  |  end
15  |  if S_max < θ then N_neg := N_neg ∪ g
16 end
17 return N_neg;
```

| Template Goal | Matched Manually Created Goal |
|---|---|
| # of Process / Technical / Domain Related Competencies required for the Role | On the track learning of relevant technologies (as applicable like:Flex,Drool,Java,EZZ,Tibco,SQL) |
| Contribution to Focus Groups | Time spent in implementing account level initiatives per quarter |
| Number of Consulting Engagements/ New Project Wins thru Innovative Ideas | No. of unsolicited proposals leading to the revenue growth |
| % SLA compliance/ Remedy Compliance | Root Causes in TIs as per Incident Mgmt SOP. Drive for self and onsite and offshore team. |
| Number of Consulting Engagements/ New Project Wins thru Innovative Ideas | Number of Demand or Bid Management or Pre-Sales Support (Demos, RFPs) participated and contributed effectively |
| Succession/ Fluidity Planning | Number of working Backup groomed & cross transition achieved with resource optimization |

FIG. 8

SYSTEM FOR STANDARDIZATION OF GOAL SETTING IN PERFORMANCE APPRAISAL PROCESS

PRIORITY CLAIM

This U.S. patent application claims priority under 35 U.S.C. § 119 to: India Application No. 3946/MUM/2015, filed on Oct. 17, 2015. The entire contents of the aforementioned application are incorporated herein by reference.

TECHNICAL FIELD

This disclosure relates generally to performance appraisal management, and more particularly to system and method for goal standardization in performance appraisal.

BACKGROUND

Quality, utilization and productivity of the workforce are important factors to be considered by Human Resource (HR) department of an organization. Performance Appraisal (PA) of the workforce focuses on the Quality factor and is used for identifying Top Performers and laggards in the organization. As organizations become larger it becomes difficult for the HR to measure each individual's performance and so process oriented approach for performance appraisal needs to be followed.

One conventional approach for performance appraisal that is followed by large organizations is to move to role-based performance management. In role-based performance management, each individual/employee is mapped to a certain role based on the expected responsibilities and activities to be performed. Based on the role, responsibilities and activities, of an employee, the supervisor sets goals for evaluation of employee's performance. Typically, the supervisors select goals from predefined goal templates, and accordingly define roles and responsibilities of the employees. In certain scenarios, however, the supervisor can set goals manually which may not exactly fit into the standard goal template associated with a specified role High number of manually created goals may result in issues such as completeness and correctness of role definition. Assignment of unusually high number of manually created goals not similar to any of the template goals may leads to the review of the role definition to check whether some of the responsibilities and activities for the role as expected by the supervisors may be added to the standard template. Similarly, incorrect role assignment can also be the reason for high number of manually created goals, where the employee has been assigned to an incorrect role.

SUMMARY

Embodiments of the present disclosure present technological improvements as solutions to one or more of the above-mentioned technical problems recognized by the inventors in conventional systems. For example, in one embodiment, a processor-implemented method for standardization of goals associated with a performance appraisal is provided. The method includes steps of: (a) identifying, via one or more hardware processors, a plurality of labeled goals and a plurality of unlabeled goals from a plurality of goals associated with a role, the plurality of goals comprising a plurality of template goals and a plurality of manually created goals, each of the plurality of template goals associated with a class label, and wherein each of the plurality of goals associated with a corresponding goal description and corresponding self-comments; (b) training a first classifier using the goal description of the plurality of labelled goals associated with the role, via the one or more hardware processors; (c) training a second classifier using the self-comments of the plurality of labelled goals associated with the role, via the one or more hardware processors; (d) identifying candidate negative goals from the plurality of goals, via the one or more hardware processors; (e) excluding the candidate negative goals from the plurality of unlabeled goals to obtain a set of unlabeled goals, via the one or more hardware processors (f) classifying the set of unlabeled goals into a plurality of classes by the first classifier and the second classifier, via the one or more hardware processors; (g) determining a confidence score associated with the classification of each of the set of unlabeled goals into the plurality of classes, via the one or more hardware processors; (h) adding from amongst the set of unlabeled goals, one or more unlabeled goals, associated with a class label for each of the first classifier and the second classifier, the one or more unlabeled goals having the confidence score greater than or equal to a threshold value to the plurality of labeled goals to obtain an updated set of labeled goals, via the one or more hardware processors; and (i) iteratively co-training the first classifier and the second classifier using the updated set of labeled goals for a threshold number of iterations by performing steps (b)-(h), via the one or more hardware processors.

In an embodiment, the method further includes identifying the candidate negative goals from the plurality of goals and classifying each of the candidate negative goals using the first classifier to obtain a first class label and the second classifier to obtain a second class label for each of the candidate negative goal. Furthermore the method includes determining a confidence score associated with the candidate negative goals classified into each of the first class label and the second class label. Moreover the method includes assigning a null class label to the candidate negative goal on determination of the confidence score associated with the classification into the first class label being less than a first threshold score and the confidence score associated with the classification into the second class label being less than a second threshold score. Also, the method includes clustering a set of manually created goals belonging to the null class label into one or more clusters. New class labels are assigned to the manually created goals belonging to each of the one or more clusters based on identification of the words in the goal descriptions of the one or more clusters.

In another embodiment, a system for standardization of goals associated with a performance appraisal is provided. The system includes one or more memories; and one or more hardware processors, the one or more memories coupled to the one or more hardware processors wherein the one or more hardware processors are capable of executing programmed instructions stored in the one or more memories to: (a) identify a plurality of labeled goals and a plurality of unlabeled goals from a plurality of goals associated with a role, the plurality of goals comprising a plurality of template goals and a plurality of manually created goals, each of the plurality of template goals associated with a class label, and wherein each of the plurality of goals associated with a corresponding goal description and corresponding self-comments; (b) train a first classifier using the goal description of the plurality of labelled goals associated with the role; (c) train a second classifier using the self-comments of the plurality of labelled goals associated with the role; (d) identify candidate negative goals from the plurality of goals;

(e) exclude the candidate negative goals from the plurality of unlabeled goals to obtain a set of unlabeled goals; (f) classify the set of unlabeled goals into a plurality of classes by the first classifier and the second classifier; (g) determine a confidence score associated with the classification of each of the set of unlabeled goals into the plurality of classes; (h) add from amongst the set of unlabeled goals, one or more unlabeled goals, associated with a class label for each of the first classifier and the second classifier, the one or more unlabeled goals having the confidence score greater than or equal to a threshold value to the plurality of labeled goals to obtain an updated set of labeled goals; and (i) iteratively co-train the first classifier and the second classifier using the updated set of labeled goals for a threshold number of iterations by performing steps (b)-(h).

In an embodiment, the one or more hardware processors are capable of executing programmed instructions stored in the one or more memories to identify the candidate negative goals from the plurality of goals and classifying each of the candidate negative goals using the first classifier to obtain a first class label and the second classifier to obtain a second class label for each of the candidate negative goal. Furthermore, the one or more hardware processors are capable of executing programmed instructions stored in the one or more memories to determine a confidence score associated with the candidate negative goals classified into each of the first class label and the second class label. Moreover, the one or more hardware processors are capable of executing programmed instructions stored in the one or more memories to assign a null class label to the candidate negative goal on determination of the confidence score associated with the classification into the first class label being less than a first threshold score and the confidence score associated with the classification into the second class label being less than a second threshold score. Also, the one or more hardware processors are capable of executing programmed instructions stored in the one or more memories to cluster a set of manually created goals belonging to the null class label into one or more clusters. New class labels are assigned to the manually created goals belonging to each of the one or more clusters based on identification of the words in the goal descriptions of the one or more clusters.

In yet another embodiment, a non-transitory computer-readable medium having embodied thereon a computer program for executing a method for standardization of goals associated with a performance appraisal is provided. The method includes (a) identifying, via one or more hardware processors, a plurality of labeled goals and a plurality of unlabeled goals from a plurality of goals associated with a role, the plurality of goals comprising a plurality of template goals and a plurality of manually created goals, each of the plurality of template goals associated with a class label, and wherein each of the plurality of goals associated with a corresponding goal description and corresponding self-comments; (b) training a first classifier using the goal description of the plurality of labelled goals associated with the role, via the one or more hardware processors; (c) training a second classifier using the self-comments of the plurality of labelled goals associated with the role, via the one or more hardware processors; (d) identifying candidate negative goals from the plurality of goals, via the one or more hardware processors; (e) excluding the candidate negative goals from the plurality of unlabeled goals to obtain a set of unlabeled goals, via the one or more hardware processors (f) classifying the set of unlabeled goals into a plurality of classes by the first classifier and the second classifier, via the one or more hardware processors; (g) determining a confidence score associated with the classification of each of the set of unlabeled goals into the plurality of classes, via the one or more hardware processors; (h) adding from amongst the set of unlabeled goals, one or more unlabeled goals, associated with a class label for each of the first classifier and the second classifier, the one or more unlabeled goals having the confidence score greater than or equal to a threshold value to the plurality of labeled goals to obtain an updated set of labeled goals, via the one or more hardware processors; and (i) iteratively co-training the first classifier and the second classifier using the updated set of labeled goals for a threshold number of iterations by performing steps (b)-(h), via the one or more hardware processors.

In an embodiment, the method further includes identifying the candidate negative goals from the plurality of goals and classifying each of the candidate negative goals using the first classifier to obtain a first class label and the second classifier to obtain a second class label for each of the candidate negative goal. Furthermore the method includes determining a confidence score associated with the candidate negative goals classified into each of the first class label and the second class label. Moreover the method includes assigning a null class label to the candidate negative goal on determination of the confidence score associated with the classification into the first class label being less than a first threshold score and the confidence score associated with the classification into the second class label being less than a second threshold score. Also, the method includes clustering a set of manually created goals belonging to the null class label into one or more clusters. New class labels are assigned to the manually created goals belonging to each of the one or more clusters based on identification of the words in the goal descriptions of the one or more clusters.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this disclosure, illustrate exemplary embodiments and, together with the description, serve to explain the disclosed principles.

FIG. 5 illustrates an example pseudo-algorithm for identifying negative candidate foals for standardization of goal setting in performance appraisal process, in accordance with some embodiments of the present disclosure.

FIGS. 6A and 6B illustrate an example pseudo-algorithm for co-training a first classifier and a second classifier for standardization of goal setting in performance appraisal, in accordance with some embodiments of the present disclosure.

FIG. 8 illustrates examples of template goals and corresponding matched manually created goals for standardization of goals, in accordance with some embodiments of the present disclosure.

DETAILED DESCRIPTION

Figure 1:
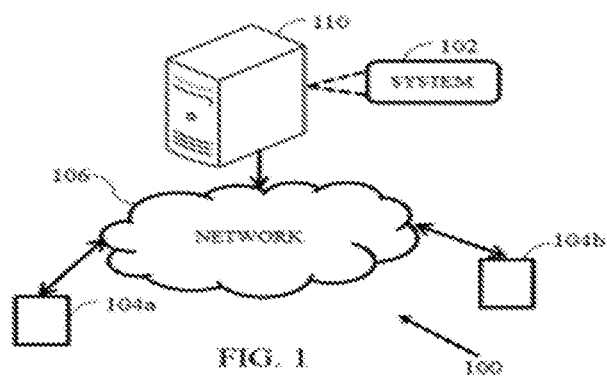
FIG. 1 illustrates a network implementation of system for goal standardization in performance appraisal, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses embodiments for system and method for goal standardization in performance appraisal. In role based performance management, each person is mapped to certain role based on the expected responsibilities and activities to be performed. The responsibilities and activities for each role have to be defined in such a way that they represent a large amount of tasks done by the workforce in the specified role. Once the role, responsibilities and activities are identified it is important to set goals with specified targets over a particular time period and then measure the performance based on the inputs given by the individual as well as the supervisor. Recently with the emergence of analytic tools, the performance appraisal process is also tracked for improvements based on process parameters. The results of this analysis also drive the process changes in the performance appraisal process.

Generally, the performance appraisal management involves multiple steps. For example initially, a role is assigned for each employee. A Goal template is associated with each role. This goal template contains a list of standardized goals based on the role definition. A supervisor sets the goals for each time period along with targets. This is known as goal setting process. Here, the supervisor has to set at least 5 goals from the Goal Template for the corresponding role of the individual. These goals are known as Template Goals. At the end of each time period, the individual writes the achievements and the remarks about the working environment from his/her perspective in Self Comments for each goal. Based on the Self Comments, the supervisor writes his/her opinion on the achievements of the individual and shortcomings if any. The supervisor scores the individual based on the performance.

In various organizations, the process of goal setting may be similar to the above mentioned process or may have variations from said process. However, the process of goal setting is similar to the one described above. In other words, the setting up of goals. In the goal setting process, supervisors expect some freedom to assign goals which are not exactly fitting the Goal Template based on the activities the individual is expected to perform. As a result the supervisors are given freedom to set goals manually in addition to the template goals. For example, the inventors conducted a survey for an organization with 156,904 confirmed employees across 869 roles. The total number of goals assigned was determined to be 2,176,974 out of which template goals were 863,465 (39.66%) and manually created goals were 1313509. The role representing the largest number of individuals was found to be that of a 'Developer' (46,476 Individuals). In such scenarios, the supervisors may create certain goals for some roles. However, such goals may be likely to be similar to one of the template/predefined goals. For example, corresponding to a goal of "completing a number of professional certifications for skill development", individual supervisors may create goals such as, but not limited to: (1) number of certifications (2) No. of certification taken (3) No. of certifications obtained (4) Domain Certification, and so on.

Due to a significant variation in the manually created goals, many challenges may be encountered during the performance appraisal process, prominent being completeness and correctness of role definition and comparison of two individuals based on Goal assignment. For example, if unusually high number of manually created goals that are not similar to any of the template goal are assigned, then the role definition should be reviewed to see whether some of the responsibilities and activities for the role as expected by the supervisors should be added. Also, generally organizations follow the method of ranking the individuals and forced distribution where the individuals are compared with each other. In such a scenario, it is important that the expectations from the individuals are comparable. Such a comparison of expectations can be done by comparing the goals set for the individuals. It is not possible unless the goals are mapped against a 'standard', or in other words, the goals are standardized. In order to overcome the above mentioned challenges, it is pertinent to standardize individual collection of goals. For example, the manually created goals may be matched to equivalent template goals, and the manually created goals that are not equivalent to any of the template goals may be kept separate (or removed from the template of goals).

Various embodiments disclosed herein provide methods and systems for goal standardization in performance appraisal, such that the manually created goals are matched with the template goals so as to predict classes for the manually created goals. Herein, the classes may refer to class labels to that are associated with the template goals. In an embodiment, to match the manually created goals with the template goals, the system utilizes a co-training approach, and trains two classifiers. One classifier is trained using the goal descriptions of all the goals while the other classifier is trained using self-comments of the goals. It will be noted that in performance appraisals, generally supervisors set crisp, direct and objective goals, most of the goal descriptions are short having average length of around ten words. Classification of short documents may be performed using natural language processing and information retrieval communities.

It will be noted that herein, since the training for the classifier is not large, the precision and recall for the classifier may be low. In addition, the text in the goal descriptions are typically short text which may not explain regarding exact class labels as many words and synonyms thereof may not be available. Due to scarcity of labelled data and high cost involved in construction of it, semi-supervised learning approaches are used that uses both labelled as well as unlabelled data for training of classifiers. The disclosed embodiments provides methods and systems to innovatively design a classifier that iteratively extends the training set with high confidence and classifies the data. In addition, a co-training approach is used to classify this data. The co-training approach involves two classifiers (both can be same or different) such that both the classifiers trains each other iteratively. In particular, co-training requires two mutually independent feature views where each individual view is sufficient for classification. Two models are trained with initial labelled data, each using one of the feature views. The two trained models are then used to classify the remaining unlabelled records and very high confidence predictions by either of the model, are added to the labelled data. The models are re-trained using the additional labelled data and the process is repeated. Short text with side information can be easily mapped to two separate feature views, namely, (i) Features derived from short text itself; and (ii) Features derived from the side information. A significant contribution of the disclosed embodiments is that a self-assessment text written by the employee is utilized to get more information about the manually created goal as the data input for one of the classifiers.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for goal standardization in performance appraisal shall be implemented, has been explained in details with respect to the FIGS. 1 through 8. While aspects of described methods and systems for standardization of goal setting in performance appraisal process can be implemented in any number of different systems, utility environments, and/or configurations, the embodiments are described in the context of the following exemplary system(s).

Referring now to FIG. 1, a network implementation 100 of system 102 for goal standardization in performance appraisal is illustrated, in accordance with an embodiment of the present subject matter. The network implementation 100 is shown to include a system 102, user devices such as user devices 104-1, 104-2 . . . 104-N, and a communication network 106 for facilitating communication between the system 102 and the user devices 104-1, 104-2 . . . 104-N.

The system 102 facilitates classification of already assigned goals for a given role and provides a mechanism for further classification of newly created goals during goal setting process. The system assists the supervisor to select a template goal by classifying the custom goal that is being set by the supervisor. The system 102 also clusters those goals which are not classified by the classifier. Some of the dense clusters during the classification of the goals are potential candidates to be added to the template for the role. The system 102 is configured to identify the representative goals for those dense clusters associated with a role, and add such goals to the goals template.

Although the present subject matter is explained considering that the system 102 is implemented for goal standardization in performance appraisal, it may be understood that the system 102 may is not restricted to any particular machine or environment. The system 102 may be implemented in a variety of computing systems, such as a laptop computer, a desktop computer, a notebook, a workstation, a mainframe computer, a server, a network server, and the like.

The devices 104 are communicatively coupled to the system 102 through a network 106, and may be capable of transmitting the signals to the system 102. In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In an embodiment, the system 102 may be embodied in a computing device 110. Examples of the computing device 110 may include, but are not limited to, a desktop personal computer (PC), a notebook, a laptop, a portable computer, a smart phone, a tablet, and the like. An example implementation of the system 102 for goal standardization in performance appraisal is described further with reference to FIG. 2.

Figure 2:
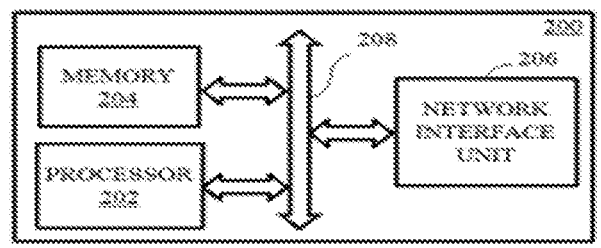
FIG. 2 illustrates a block diagram of a system for goal standardization in performance appraisal, in accordance with some embodiments of the present disclosure.

FIG. 2 illustrates a block diagram of a system 200 for goal standardization in performance appraisal, in accordance with an embodiment of the present disclosure. In an example embodiment, the system 200 may be embodied in, or is in direct communication with a computing device, for example the computing device 110 (FIG. 1). The system 200 includes or is otherwise in communication with one or more hardware processors such as a processor 202, one or more memories such as a memory 204, and a network interface unit such as a network interface unit 206. In an embodiment, the processor 202, memory 204, and the network interface unit 206 may be coupled by a system bus such as a system bus 208 or a similar mechanism.

The processor 202 may include circuitry implementing, among others, audio and logic functions associated with the communication. For example, the processor 202 may include, but are not limited to, one or more digital signal processors (DSPs), one or ore microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The one or more memories such as a memory 204, may store any number of pieces of information, and data, used by the system to implement the functions of the system. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system to behave in a manner as described in various embodiments.

The network interface unit 206 is configured to facilitate communication between the devices 104 and the computing device 110. The network interface unit 206 may be in form of a wireless connection or a wired connection. Examples of wireless network interface unit 206 may include, but are not limited to, IEEE 802.11 (Wi-Fi), BLUETOOTH®, or a wide-area wireless connection. Example of wired network interface element 206 includes, but is not limited to Ethernet.

The system 200 facilitates in a classification of manually created goals (or custom goal) for a given role. Every role has a defined plurality of template goals that defines the nature of work for the role. The system 200 is caused to group such roles based on similarity thereof, thereby creating the set of classes (or class labels) for the classification. In an embodiment, the system 200 facilitates in classification of manually created goals (or custom goals) into a plurality of classes for a given role by utilizing a semi-supervised learning based approach. In an embodiment, for classification, an initial labelled data may be constructed automatically by using the set of template goals where each template goal is assigned a distinct class label. Alternatively, the system 200 may be caused to assign same class label to two or template goals based on a semantic similarity. For example, the system 200 may identify two or more template goals as semantically similar, and accordingly may assign same class labels to said two or more classes. In an embodiment, in addition to the plurality of classes, another class called as 'None' or 'Null' class may exist for accommodating/classifying goals that may not have matching with any template goal.

The system is caused to utilize a co-training framework for semi-supervised learning as there is a natural separation of information used for classification of manually created goals. The system 200 utilizes two different views V1 and V2 for each goal (including the template goal and manually created goal). The view V1 refers to the view corresponding to the goal description of the goal while the view V2 refers to the view corresponding to the Self-comments written for the goal.

Herein the term 'Goal description' refers to the description of goal provided by the supervisor. Also the term 'self-comments' refers to the description provided by the employee in response to the goal to indicate/justify the complete/partial fulfillment of goal by the employee.

Herein, the view V2 corresponding to the self-comments is utilized for classification as it is understood that similar goals are understood by the individuals in similar way and hence the corresponding self-comments tend to be similar.

The system 200 is caused to train two different classifiers, namely a first classifier and a second classifier, each using features generated from only one of the views. For example, the first classifier is trained using features generated from the goal description of the goals while the second classifier is trained by utilizing the features generated from the self-comments corresponding to the goal descriptions. In an embodiment, the system 200 uses maximum entropy classifier with real-valued features. The generation of features from the two views, and training of classifiers by using said features is described below.

The system 200 is caused to train a first classifier using the goal description of the plurality of labelled goals associated with the role. To train the first classifier based using the goal description, the system 200 is caused to obtain a first set of feature vectors from the goal description of the plurality of goals such that root-word of each word in the goal description becomes a feature. The value of the feature may be set to $\delta^i$, where $0<\delta^i<1$ and i is the index of the corresponding word. It will be note that the value corresponding to a word feature is lower if that word appears later in the goal description. In practice, the value of $\delta^i$ equal to 0:95 may be used.

In an embodiment, to obtain a feature vector of the first set of feature vectors, the system identifies a goal description of the plurality of goal descriptions having two or more words occurring in a single template goal description. The two or more words are combined to form a feature vector of the first set of feature vectors. In an embodiment, the feature vector may be associated with a fixed weight. For example, if a goal description contains any two words such that both the words occur in a single template goal description, then such a combination of two words becomes a feature with a fixed weight of, for example, 1:5. Herein, it may be understood that since the goal descriptions are generally short, such pair of words may be preferred for forming the feature vector.

The system 200 is further caused to train a second classifier using self-comments of the plurality of labelled goals associated with the role. In an embodiment, to train the second classifier the system is caused to identify root-words of all the words used in self-comments. The root-words are derived from all the words of self-comments to form the features vector of the second set of feature vectors. In an embodiment, to identify the root-words, the system is caused to create a bag-of-words for each goal description of the plurality of goal-descriptions by using the set of self-comments. The bag-of-words may be viewed as a large document. The system computes a Term Frequency-Inverse Document Frequency (TF-IDF) scores corresponding to each word of the bag-of-words using an Information Retrieval (IR) literature. The value of TF-IDF score corresponding to each of word feature represents the value of the feature of the second set of feature vectors. Examples of the first and the second classifiers may include, but are not limited to Naive Bayes and Maximum Entropy classifiers.

The first classifier and the second classifier are trained by the first set of feature vectors and the second set of feature vectors, respectively. Herein, the first and the second set of feature vectors forms positive instances samples for training the first and second set of feature vectors. As will be noted here, the initial labelled data (plurality of labelled goals) is constructed automatically using the set of template goals. During construction of the set of the labelled goals, the goals are labeled with positive labels only as the class corresponding to negative labels is not characterized using a finite plurality of labelled example, thereby posing a challenge to train a classifier with just positive examples. In an embodiment, the system 200 is caused to identifying negative candidate goals from the plurality of goals. Such negative candidate goals are utilized by the system 200 to train the first and the second set of classifiers for negative instances.

In an embodiment, to identify the negative candidate goals from the plurality of goals, the system 200 associate a first word vector and a second word vector with each goal of the plurality of goals. Herein, the first word vector and the second word vector are vector-space representations obtained from the views V1 and V2 of goals. The system 200 determines a similarity between the first word vector and a second word vector of the each goal. In an embodiment, the system may determine the similarity between the first and the second word vector of each goal based on a similarity measure. Examples of techniques used for determining similarity measure may include, but are not limited to, cosine similarity, Dice and Jaccard. In an embodiment, for determining cosine similarity between the first word vector and the second word vector, each goal description is represented with a TF-IDF based word vector. Similarity between any two goal descriptions g1 and g2 is computed as follows $$CosineSimilarity(g_1, g_2) = \frac{\vec{wv_1} \cdot \vec{wv_2}}{\|\vec{wv_1}\|\|\vec{wv_2}\|}$$

Where, $\vec{wv}_1$ and $\vec{wv}_2$ are word vector representations of g1 and g2, respectively.

For Dice and Jaccard similarity, each goal description is initially cleaned, and represented with a set of words contained in the clean description.

$$DiceSimilarity(g_1, g_2) = \frac{2 \cdot |S_1 \cap S_2|}{|S_1| + |S_2|}$$

$$JaccardSimilarity(g_1, g_2) = \frac{|S_1 \cap S_2|}{|S_1 \cup S_2|}$$

where S1 and S2 are set of words representing g1 and g2, respectively.

One or more manually created goals having highest similarity with a template goal of the plurality of template goals and lower than a pre-defined threshold are identified as candidate negative goals. A detailed algorithm (Algorithm 1) of identification of candidate negative goals is described further with reference to FIG. 5.

The system 200 excludes the negative candidate goals from the plurality of unlabeled goals to obtain set unlabeled goals. The system 200 classifies the set of unlabeled goals into a plurality of classes by the first classifier and the second classifier. In an embodiment, all the unlabeled goals which are not candidates for "negative" class are classified into various class labels using both the classifiers, namely the first classifier and the second classifier. In addition, the system 200 determines a confidence score associated with the classification of each of the set of goals into the plurality of classes. One or more unlabeled goals associated with a class label for each of the first and second classifier and having the confidence score greater than or equal to a threshold value are added by the system 200 to the plurality of labeled goals to obtain an updated set of labeled goals. The system 200 is caused to record the prediction (or the class label) as well as the confidence score associated with the classification of each of the unlabeled goals. In an embodiment, said prediction (or class label) and the confidence score may be stored in the memory 204 of the system 200. Herein, it will be noted that if the only criteria for adding instances to the plurality of labelled goals is to check whether the classification probability is more than a predetermined threshold, then some class imbalance may get introduced in the labelled goal set in each iteration. An imbalance of such skewed class distribution in the first iteration of co-training algorithm is illustrated further with reference to FIGS. 7A and 7B. In order to prevent this skewed behavior, the system 200 enforces a constraint on maximum ($ADD_{max}$) and minimum ($ADD_{min}$) number of instances of any class to be added to the labelled set in each iteration, thereby ensuring that all the classes get a fair representation in the labelled data. In an embodiment, the system 200 is caused to add the unlabeled instances with high confidence scores to the plurality of labelled instances such that the constraint on minimum and maximum number of additions are complied with.

The system 200 is caused to iteratively co-train the first classifier and the second classifier using the updated set of labeled goals for a threshold number of iterations. The system 200 iteratively repeats the steps of training the first and second classifiers using the updated set of labeled goals, identifying candidate negative goals, classifying the set of unlabeled goals into the plurality of classes by the first and second classifier, determining the confidence score associated with the classification of each of the set of unlabeled goals into the plurality of classes, and updating the set of labeled goals.

After co-training iterations, the system 200 is caused to classify all the remaining unlabeled instances (including "candidate" negative instances) using the first classifier and the second classifier. If at least one classifier predicts a class label with the confidence greater than the defined thresholds, then the identified class label is assigned. Rest of the instances are labelled as NONE. A detailed pseudo-algorithm for co-training the first and the second classifier s described further with reference to FIGS. 6A and 6B. An example flow diagram of a method for goal standardization in performance appraisal is described further with reference to FIG. 3.

In an embodiment, the system may classify each of the candidate negative goals using the first classifier to obtain a first class label and the second classifier to obtain a second class label for the candidate negative goal. Further, the system 200 may determine a confidence score associated with the candidate negative goals classified into each of the first class label and the second class label. In case, the system determines the confidence score associated with the classification into the first class label to be less than a first threshold score and the confidence score associated with the classification into the second class label to be less than a second threshold score, the system 200 assigns a null class label to the candidate negative goal. Further, the system may cluster a set of manually created goals belonging to the null class label into one or more clusters. The manually created goals belonging to each of the one or more clusters may be assigned new class labels on identification of the words in the goal descriptions of the one or more clusters.

In an embodiment, the system 200 is caused to update the plurality of template goals with latest expectations from the role in terms of responsibilities, activities and tasks to be performed. The clustering and adding representative goals from the dense clusters aids the updating of the plurality of template goals. For instance, with time, some of the template goals associated with a role may become less or completely relevant, and may not be assigned to the employees in that rols. The system 200 may be caused to determine whether a template goal or a corresponding manually created goal is not assigned to a threshold number of employees for a predetermined duration of time, then such goals may be selected as candidates for removing from the plurality of template goals. Said goals can be removed from the plurality of template goals after a review, if required.

Figure 3:
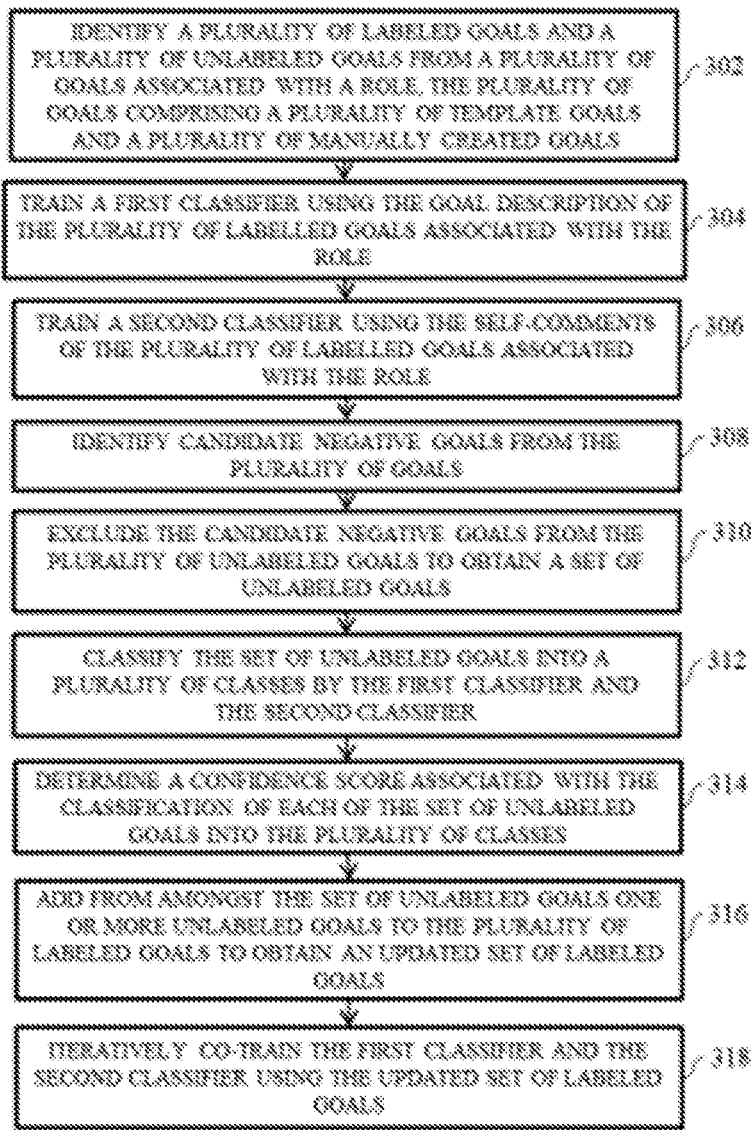
FIG. 3 illustrates a flow diagram of a method for goal standardization in performance appraisal, in accordance with some embodiments of the present disclosure.

FIG. 3 illustrates a flow diagram of a method 300 for goal standardization in performance appraisal, in accordance with an example embodiment. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof. In an embodiment, the method 300 depicted in the flow chart may be executed by a system, for example, the system 200 of FIG. 2. In an example embodiment, the system 200 may be embodied in a computing device, for example, the computing device 110 (FIG. 1).

At 302, the method 300 includes identifying, via one or more hardware processors, a plurality of labeled goals and a plurality of unlabeled goals from a plurality of goals associated with a role. The plurality of goals includes a plurality of template goals and a plurality of manually created goals. Each of the plurality of template goals is associated with a class label. Each of the plurality of goals is associated with a corresponding goal description and corresponding self-comments. At 304, the method 300 includes training a first classifier using the goal description of the plurality of labelled goals associated with the role, via the one or more hardware processors. Further, a second classifier using the self-comments of the plurality of labelled goals associated with the role, via the one or more hardware processors at 306. At 308, the method 300 includes identifying, via the one or more hardware processors, candidate negative goals from the plurality of goals.

At 310, the method 300 includes excluding the candidate negative goals from the plurality of unlabeled goals to obtain a set of unlabeled goals, via the one or more hardware processors. At 312, the method 300 includes classifying the set of unlabeled goals into a plurality of classes by the first classifier and the second classifier, via the one or more hardware processors. At 314, the method 300 includes determining a confidence score associated with the classification of each of the set of unlabeled goals into the plurality of classes, via the one or more hardware processors. At 316, the method 300 includes adding from amongst the set of unlabeled goals, one or more unlabeled goals, associated with a class label for each of the first classifier and the second classifier to obtain an updated set of labeled goals, via the one or more hardware processors. The one or more unlabeled goals may have the confidence score greater than or equal to a threshold value to the plurality of labeled goals. At 318, the method 300 iteratively co-training the first classifier and the second classifier by using the updated set of labeled goals for a threshold number of iterations, via the one or more hardware processors. In an embodiment, the steps of training the first and second classifiers using the updated set of labeled goals, identifying candidate negative goals, classifying the set of unlabeled goals into the plurality of classes by the first and second classifier, determining the confidence score associated with the classification of each of the set of unlabeled goals into the plurality of classes, and updating the set of labeled goals, are iteratively repeated for a threshold number of iterations. A detailed flowchart of goal standardization in performance appraisal, in accordance with an example embodiment, is described further with reference to FIGS. 4A and 4B.

Figure 4A:
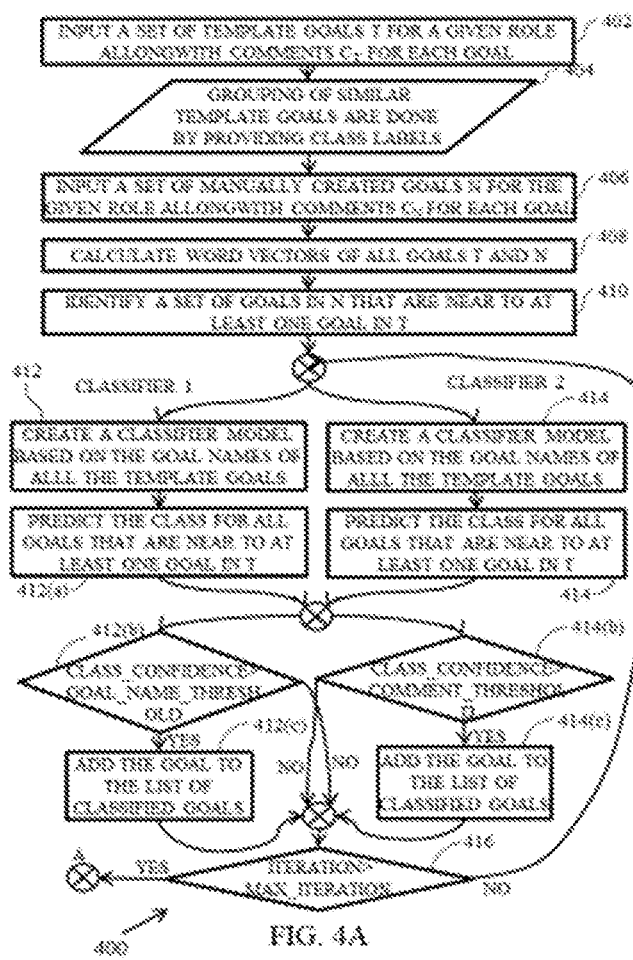
FIGS. 4A and 4B illustrate a flow diagram of a method for goal standardization in performance appraisal, in accordance with some embodiments of the present disclosure.
Figure 4B:
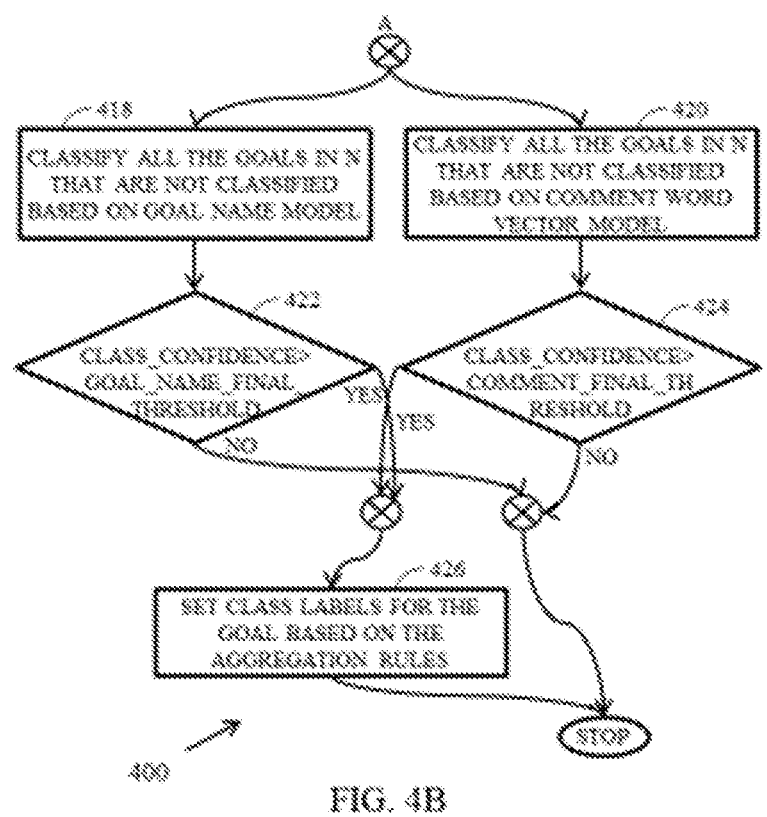

FIGS. 4A and 4B illustrate a flow diagram of a method 400 for goal standardization in performance appraisal, in accordance with an example embodiment. The method 400 may be described in the general context of computer executable instructions. Further, the method 400 can be implemented in any suitable hardware, software, firmware, or combination thereof. In an embodiment, the method 400 depicted in the flow chart may be executed by a system, for example, the system 200 of FIG. 2. In an example embodiment, the system 200 may be embodied in a computing device, for example, the computing device 110 (FIG. 1).

At 402, for each given role R a set of pre-defined template goals T along with self-comments Ct are provided as input to the system 200. Similar template goals are grouped by the system 200 by providing class labels, as shown in step 404. At step 406, a set of manually created goals N for the given role R with self-comments Cn for each goal is provided as input. Word vectors of all goals T and N are calculated at step 408. At step 410, a set of goals from the manually created goals N which are similar to at least one goal present in the set of pre-defined template goals T is identified. The goals identified at step 410 are given as input to the first, for example classifier1 and the second classifier, for example, the classifier 2 along with goals in T and the goals remaining are sent directly to steps 418 and 420 for second iteration of classification. At step 412, the classifier1 is based on the goal names or goal descriptions of all the template goals T. At step 412(a) the class for all goals which are similar to at least one goal in T is predicted by the classifier1. At step 414, the classifier2 is based on the features or word vectors of self-comments of all the template goals. At step 414(a) the class for all goals which are similar to at least one goal in T is predicted by the classifier2. In an example embodiment the class "confidence" is chosen by the classifiers for matching the pre-defined template goals and manually created goals. At step 412(b), class "confidence" and goal name "threshold" is utilized by classifier1 to match the manually created goals and template goals. Similarly, at step 414(b), class "confidence" with self-comment "threshold" is utilized by classifier2 to match the manually created goals and pre-defined template goals. If no match is found by the two classifiers the goal is moved to step 416. The matched goal from the classifiers is added to the list of classified goals by the classifier1 (at step 412(c)) and classifier2 (at step 414 (c)). At the step 416, the set of classified goals by each classifier is compared. If the goal is classified by any classifier with a value greater that a threshold value then the goal is added to the set of classified goals and provided for training in the next iteration. If the goal is classified with a value lesser than a threshold value, then the goal remains unlabeled and is provided as input. At step 416, the condition for maximum iteration is checked.

The set of goals N that are not classified are now classified based on goal name or goal description model, as shown at step 418. At step 420, the set of goals N that are not classified based are now classified by the classifier based on self-comment model. A second iteration of classification is done based on the goal name "final threshold" and self-comment "final threshold". The remaining goals are classified by the classifiers on the model generated from the last iteration and classes for different manually created goals are predicted. If the manually created goals and template goals match then class labels are set based on aggregation rules as shown in step 426. If the goals do not match then they are defined as unlabeled after the classification is completed by the classifiers. Semantically similar groups of the unlabeled manually created goals are created by clustering. A pre-decided number of large size clusters of semantically similar groups are suggested to the domain experts for inclusion in the goal template.

FIG. 5 illustrates an example pseudo-algorithm (Algorithm-1) 500 for identifying negative candidate goals for standardization of goal setting in performance appraisal process, in accordance with an example embodiment. As described previously with reference to FIGS. 2-4, for each goal, two word vectors are associated which are vector-space representations generated using the views, for example a goal description view V1 and a self-comments view V2, from the goals data associated with the plurality of labelled goals. The creation of the word vectors, for example a first word vector and a second word vector is illustrated with reference to lines 1-5 of the pseudo-algorithm 1.

For each manually created goal, a similarity of said manually created goal with all the template goals is determined. Both the views V1 and V2 may be considered and cosine similarity between the first and second word vectors is used as a similarity measure. The determination of similarity measure between the first and second word vectors is described in lines 7-14 of pseudo-algorithm 1. All the manually created goals having the highest similarity with any template goal, lower than a pre-defined threshold, may be identified as candidate negative goals, as described in line 15 of the pseudo-algorithm 1.

Figure 6A:
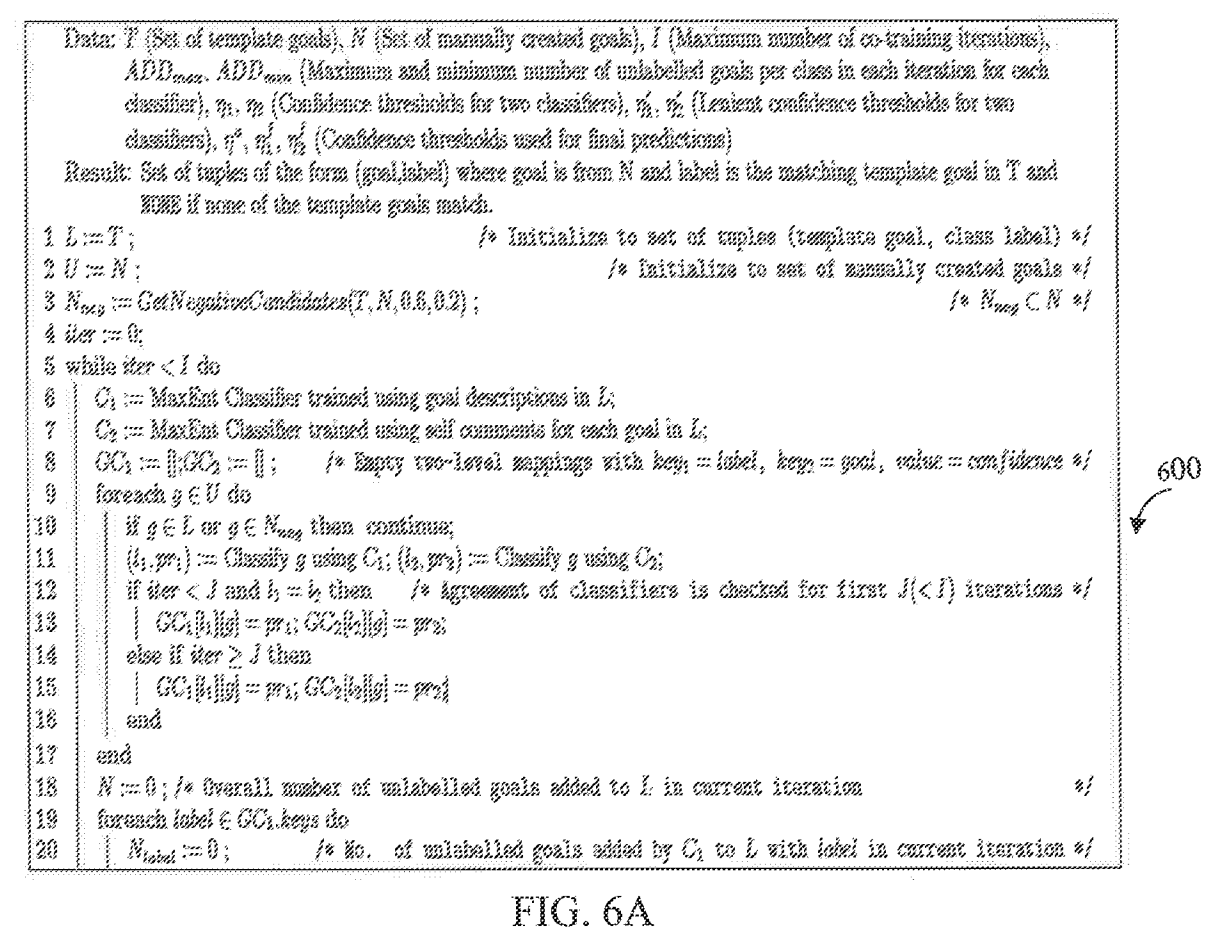
Figure 6B:
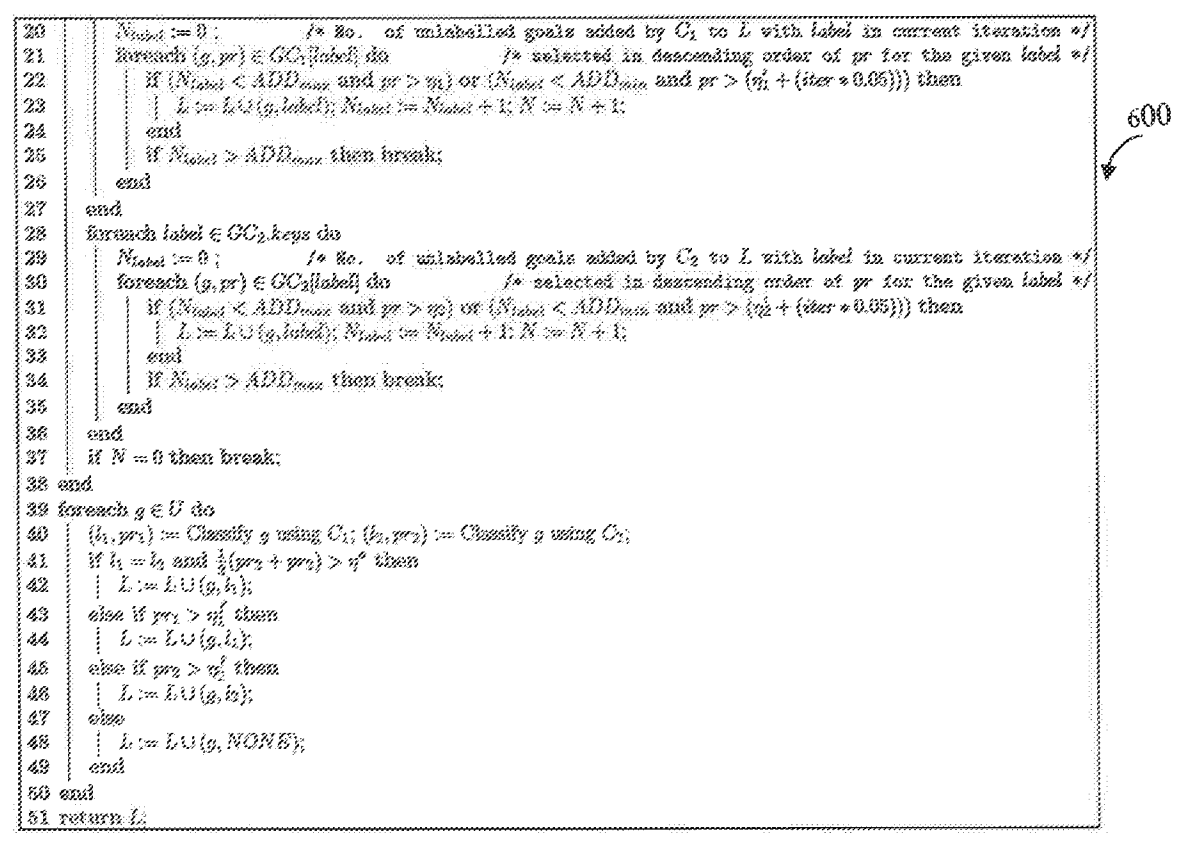

FIGS. 6A and 6B illustrates an example pseudo-algorithm (Algorithm-2) 600 for co-training a first classifier and a second classifier for standardization of goal setting in performance appraisal, in accordance with an example embodiment.

As described in the pseudo-algorithm 600, an initial labelled data is automatically created by labelling each template goals with different class label. All the manually created goals constitute the initial set of unlabeled goals. A set of "candidate" negative instances are identified (at line 3) and these instances do not participate in co-training iterations. Two classifiers are trained using the labelled data, a first classifier C1 using the goal descriptions view, V1 and (ii) a second classifier C2 using self-comments view, V2 (lines 6-7). All the unlabeled goals which are not candidates for "negative" class are classified using both C1 and C2. The predictions along with classification confidence are recorded (at lines 9-17). For each classifier, for each class label, unlabeled instances predicted with high confidence are added to the plurality of labelled instances such that the constraints on minimum and maximum number of additions are complied with (lines 19-36). The steps (of training the first and second classifier, classification of unlabeled goals using the first and the second classifiers, and updating the plurality of labelled instance with the classified and labelled instances) are repeated till number of iterations reaches the specified limit or no new additions take place. After co-training iterations, all the remaining unlabeled instances (including "candidate" negative instances) are classified using both the classifiers. If at least one classifier predicts a class label with the confidence greater than the defined thresholds, then the identified class label is assigned (lines 41-46). Rest of the instances are labelled as NONE (lines 47-48).

Herein, it will be noted that the co-training process stops if no new additions in labelled data happens in any iteration. To limit the training time, a limit I on number of iterations may be used. In addition, in the initial J iterations where J<I, the labelled data is updated with the classified data point only if both the classifiers predict the same class label with confidences greater than the respective thresholds, $\eta_1$ and $\eta_2$. Here, $\eta_1$ and $\eta_2$ are the confidence thresholds for classifiers C1 and C2 respectively to add goals into the labelled data during co-training. Also, a constraint on maximum ($ADD_{max}$) and minimum ($ADD_{min}$) number of instances of any class may be added to the labelled set in each iteration in order to address the problem of class imbalance. In an embodiment, during co-training, if the condition of $ADD_{min}$ is not satisfied, then an original confidence thresholds may be reduced to $\eta_1'$ and $\eta_2'$. After co-training, the final predictions for the unlabeled goals are determined using $\eta^a$, $\eta_1^f$, $\eta_2^f$ thresholds. In an example implementation, values of various parameters used for co-training may include:

I=0.5; J=3; $\eta_1$=0:8; $\eta_2$=0:8; $ADD_{max}$=10; $ADD_{min}$=1
$\eta_1'$=0.3, $\eta_2'$=0.4, $\eta^a$=0.2, $\eta_1^f$=0.4, $\eta_2^f$=0.5

Figure 7A:
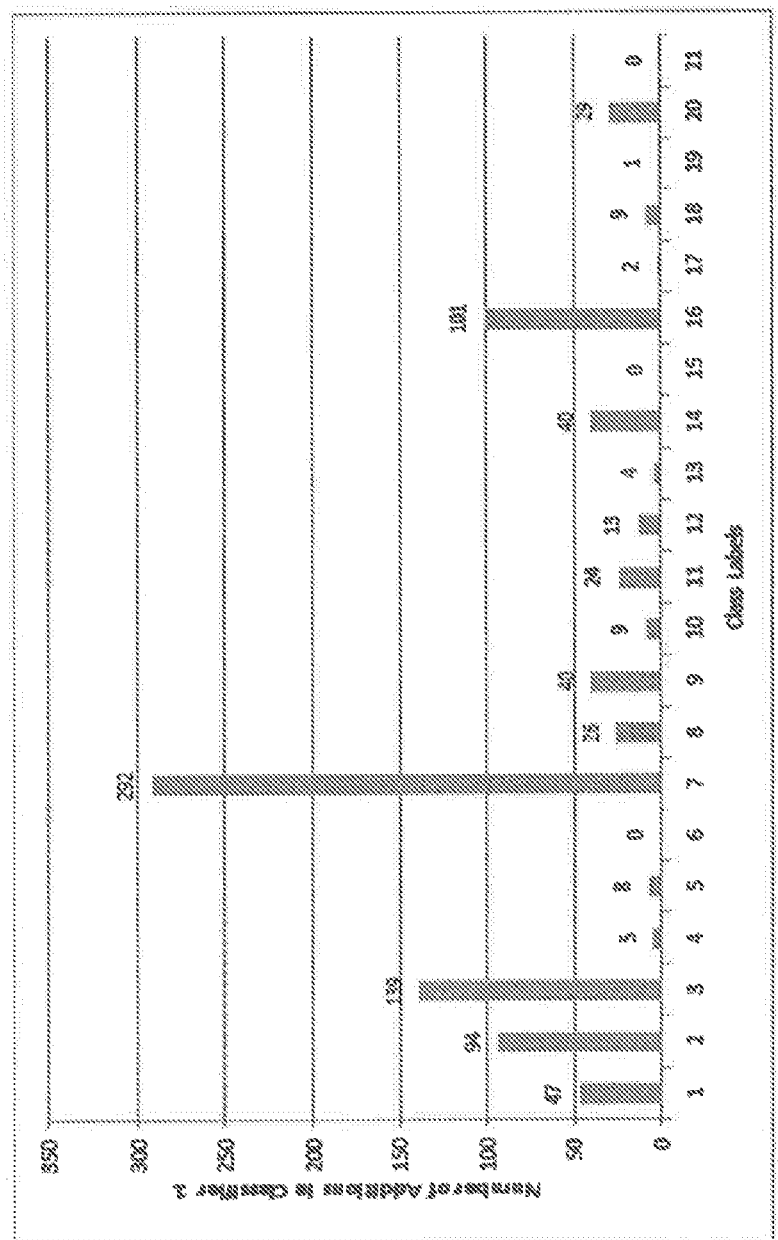
FIGS. 7A and 7B illustrate class distribution of instances classified by a first classifier and a second classifier, respectively for standardization of goal setting in performance appraisal, in accordance with some embodiments of the present disclosure.
Figure 7B:
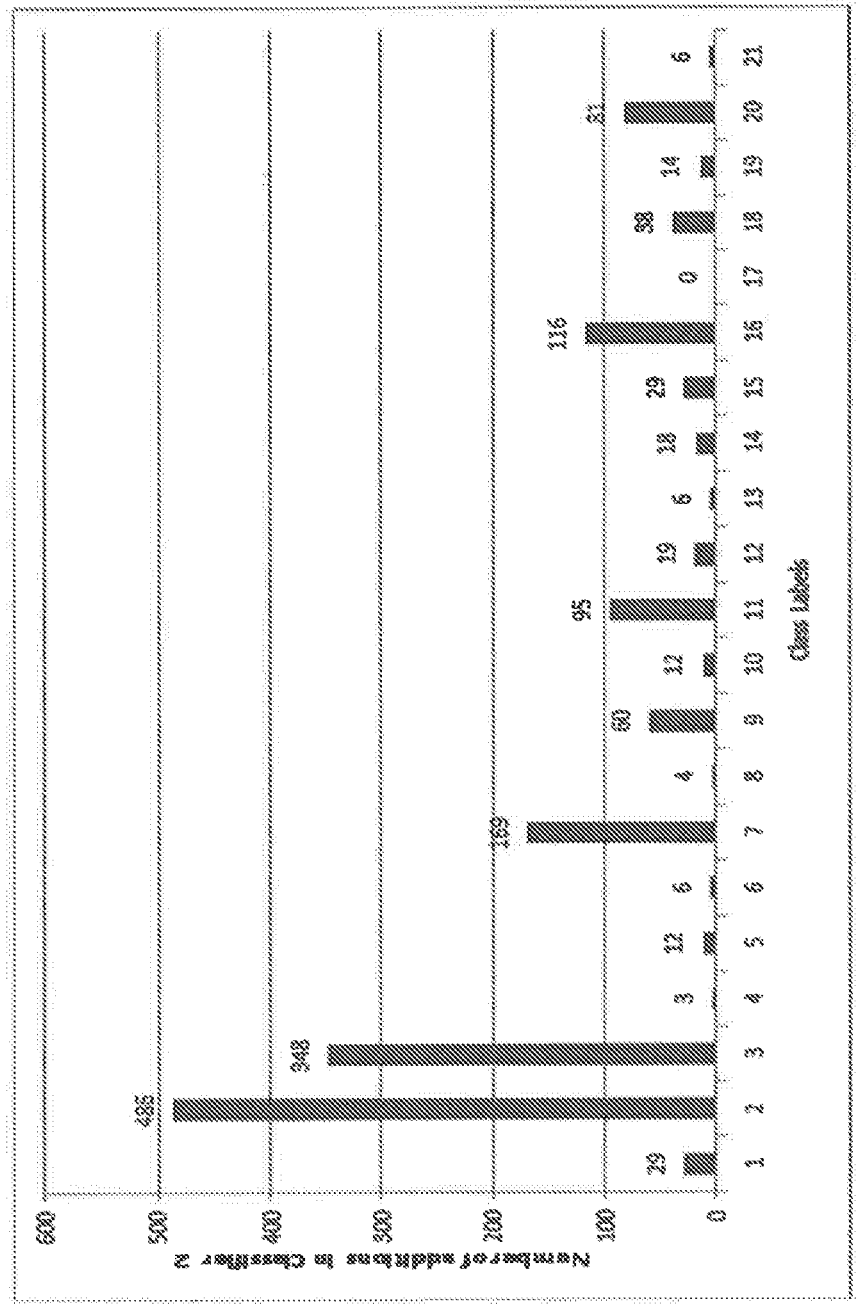

FIGS. 7A and 7B illustrate class distribution of instances classified by a first classifier and a second classifier, respectively for standardization of goal setting in performance appraisal, in accordance with an example embodiment. As described with reference to FIGS. 2, 3 and 6, in each iteration of the co-training, the unlabeled instances (or, the one or more unlabeled goals) which are classified with high confidence are added to the labelled data (or, the plurality of labelled goals) along with the predicted class label. As a template goal corresponds to a class label, depending on the variation in the manually created goals belonging to a particular template goal, the confidence values assigned for each class may vary. If the only criteria for adding instances to the labelled set is to check whether the classification probability is more than a predefined threshold, then some class imbalance may get introduced in the labelled set in each iteration. Such a skewed class distribution in the first iteration of co training algorithm is illustrated with reference to FIGS. 7A and 7B, if a fixed threshold is used to select instances to add.

As previously described, in order to prevent such skewed class distribution, the embodiments enforces a constraint on maximum and minimum number of instances of any class to be added to the labelled set in each iteration, thereby ensuring that all classes get a fair representation in the labelled data.

FIG. 8 illustrates examples of template goals and corresponding matched manually created goals for standardization of goals, in accordance of present embodiment.

The above mentioned experiments and examples are only provided for understanding the disclosed subject matter however the same may not be considered to limit the scope of the instant disclosure which is only limited by the following claims Various embodiments provide method and system for goal standardization for appraisal process. In an embodiment, the method is based on co-training framework so as to achieve more recall and coverage. The disclosed method requires no supervision and makes use of additional information from self-comments. For example, for a goal description: "Effort in process improvement initiatives", the method is able to match it correctly to the template goal "Re-engineering saves" even though there are no explicit keywords for this template goal in the goal description. Herein, it will be appreciated that the self-comments provides the knowledge that "Process improvement" is semantically similar to "Re-engineering saves". Likewise, more keywords are from self-comments which results in better recall and coverage The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for standardization of goals associated with a performance appraisal, the method comprising steps of:
   (a) identifying, via one or more hardware processors, a plurality of labeled goals and a plurality of unlabeled goals from a plurality of goals associated with a role, the plurality of goals comprising a plurality of template goals and a plurality of manually created goals, each of the plurality of template goals associated with a class label, and wherein each of the plurality of goals associated with a corresponding goal description and corresponding self-comments;
   (b) training a first classifier using the goal description of the plurality of labeled goals associated with the role, wherein training the first classifier obtains a first set of feature vectors such that a root-word of each word in the goal description becomes a feature, via the one or more hardware processors;
   (c) training a second classifier using the self-comments of the plurality of labeled goals associated with the role, wherein training the second classifier is based on identifying root-words of all the words used in self-comments, wherein the root-words are derived from all the words of self-comments to form the feature vector of a second set of feature vectors, via the one or more hardware processors;
   (d) identifying candidate negative goals from the plurality of goals, via the one or more hardware processors;
   (e) excluding the candidate negative goals from the plurality of unlabeled goals to obtain a set of unlabeled goals, via the one or more hardware processors;
   (f) classifying the set of unlabeled goals into a plurality of classes by the first classifier and the second classifier, by utilizing a co-training framework for semi-supervised learning based approach and matching the manually created goals with the plurality of template goals, via the one or more hardware processors, wherein the plurality of labeled goals are constructed automatically using the plurality of template goals for classification;
   (g) determining a confidence score associated with the classification of each of the set of unlabeled goals into the plurality of classes, via the one or more hardware processors;
   (h) adding from amongst the set of unlabeled goals, one or more unlabeled goals to the plurality of labeled goals to obtain an updated set of labeled goals, the one or more unlabeled goals associated with a class label for each of the first classifier and the second classifier, the one or more unlabeled goals having the confidence score greater than or equal to a threshold value, via the one or more hardware processors; and
   (i) iteratively co-training the first classifier and the second classifier using the updated set of labeled goals for a threshold number of iterations by performing steps of training the first and second classifiers using the updated set of the labeled goals, identifying candidate negative goals, classifying the set of unlabeled goals into the plurality of classes by the first and second classifier, determining the confidence score associated with the classification of each of the set of unlabeled goals into the plurality of classes, and updating the set of labeled goals, via the one or more hardware processors.

2. The method of claim 1, wherein obtaining the feature vector of the first set of feature vectors, comprises:
   identifying two or more words from the goal description of the labeled goals; and
   combining the two or more words obtained from the goal descriptions of the labeled goals.

3. The method of claim 1, wherein identifying the root-words, comprises:
   creating a bag-of-words for each goal description of the plurality of goal-descriptions by using the set of self-comments; and
   computing Term Frequency-Inverse Document Frequency (TF-IDF) scores corresponding to each word of the bag-of-words using an Information Retrieval (IR) literature.

4. The method of claim 1, wherein identifying the candidate negative goals from the plurality of goals comprises:

associating a first word vector and a second word vector with each goal of the plurality of goals;

determining cosine similarity between the first word vector and the second word vector of the each goal; and identifying one or more manually created goals from amongst the plurality of manually created goals having highest similarity with a template goal of the plurality of template goals and lower than a pre-defined threshold.

5. The method of claim 4, further comprising:

classifying each of the candidate negative goals using the first classifier to obtain a first class label and the second classifier to obtain a second class label for each of the candidate negative goal;

determining a confidence score associated with the candidate negative goals classified into each of the first class label and the second class label; and assigning a null class label to the candidate negative goal on determination of the confidence score associated with the classification into the first class label being less than a first threshold score and the confidence score associated with the classification into the second class label being less than a second threshold score.

6. The method of claim 5, further comprising:

clustering a set of manually created goals belonging to the null class label into one or more clusters; and assigning new class labels to the manually created goals belonging to each of the one or more clusters based on identification of the words in the goal descriptions of the one or more clusters.

7. A system for standardization of goals associated with a performance appraisal, the system comprising one or more memories; and one or more hardware processors, the one or more memories coupled to the one or more hardware processors, wherein the one or more hardware processors are programmed to execute instructions stored in the one or more memories to:

(a) identify a plurality of labeled goals and a plurality of unlabeled goals from a plurality of goals associated with a role, the plurality of goals comprising a plurality of template goals and a plurality of manually created goals, each of the plurality of template goals associated with a class label, and wherein each of the plurality of goals associated with a corresponding goal description and corresponding self-comments;

(b) train a first classifier using the goal description of the plurality of labeled goals associated with the role, wherein training the first classifier obtains a first set of feature vectors such that root-word of each word in the goal description becomes a feature;

(c) train a second classifier using the self-comments of the plurality of labeled goals associated with the role, wherein training the second classifier is based on identifying root-words of all the words used in self-comments, wherein the root-words are derived from all the words of self-comments to form the feature vector of a second set of feature vectors;

(d) identify candidate negative goals from the plurality of goals;

(e) exclude the candidate negative goals from the plurality of unlabeled goals to obtain a set of unlabeled goals;

(f) classify the set of unlabeled goals into a plurality of classes by the first classifier and the second classifier, by utilizing a co-training framework for semi-supervised learning based approach and matching the manually created goals with the plurality of template goals, wherein the plurality of labeled goals are constructed automatically using the plurality of template goals for classification;

(g) determine a confidence score associated with the classification of each of the set of unlabeled goals into the plurality of classes;

(h) add from amongst the set of unlabeled goals, one or more unlabeled goals to the plurality of labeled goals to obtain an updated set of labeled goals, associated with a class label for each of the first classifier and the second classifier, the one or more unlabeled goals having the confidence score greater than or equal to a threshold value; and (i) iteratively co-train the first classifier and the second classifier using the updated set of labeled goals for a threshold number of iterations by performing steps of training the first and second classifiers using the updated set of the labeled goals, identifying candidate negative goals, classifying the set of unlabeled goals into the plurality of classes by the first and second classifier, determining the confidence score associated with the classification of each of the set of unlabeled goals into the plurality of classes, and updating the set of labeled goals.

8. The system of claim 7, wherein to obtain the feature vector of the first set of feature vectors, the one or more hardware processors are programmed to execute instructions to:

identify two or more words from the goal description of the labeled goals; and combine the two or more words obtained from the goal descriptions of the labeled goals.

9. The system of claim 8, wherein to identify the candidate negative goals from the plurality of goals, the one or more hardware processors are programmed to execute instructions to:

associate a first word vector and a second word vector with each goal of the plurality of goals;

determine cosine similarity between the first word vector and the second word vector of the each goal; and identify one or more manually created goals from amongst the plurality of manually created goals having highest similarity with a template goal of the plurality of template goals and lower than a pre-defined threshold.

10. The system of claim 9, wherein the one or more hardware processors are programmed to execute instructions to:

classify each of the candidate negative goals using the first classifier to obtain a first class label and the second classifier to obtain a second class label for the candidate negative goal;

determine a confidence score associated with the candidate negative goals classified into each of the first class label and the second class label; and assign a null class label to the candidate negative goal on determination of the confidence score associated with the classification into the first class label being less than a first threshold score and the confidence score associated with the classification into the second class label being less than a second threshold score.

11. The system of claim 10, wherein the one or more hardware processors are programmed to execute instructions to:

cluster a set of manually created goals belonging to the null class label into one or more clusters; and assign new class labels to the manually created goals belonging to each of the one or more clusters based on identification of the words in the goal descriptions of the one or more clusters.

12. The system of claim 7, wherein to identify the root-words, the one or more hardware processors are programmed to execute instructions to create a bag-of-words for each goal description of the plurality of goal-descriptions by using the set of self-comments; and compute Term Frequency-Inverse Document Frequency (TF-IDF) scores corresponding to each word of the bag-of-words using an Information Retrieval (IR) literature.

13. A non-transitory computer readable medium embodying a program executable in computing device for standardization of goals associated with a performance appraisal, the method comprising:

(a) identifying a plurality of labeled goals and a plurality of unlabeled goals from a plurality of goals associated with a role, the plurality of goals comprising a plurality of template goals and a plurality of manually created goals, each of the plurality of template goals associated with a class label, and wherein each of the plurality of goals associated with a corresponding goal description and corresponding self-comments;

(b) training a first classifier using the goal description of the plurality of labeled goals associated with the role, wherein training the first classifier obtains a first set of feature vectors such that root-word of each word in the goal description becomes a feature;

(c) training a second classifier using the self-comments of the plurality of labeled goals associated with the role, wherein training the second classifier is based on identifying root-words of all the words used in self-comments, wherein the root-words are derived from all the words of self-comments to form the feature vector of a second set of feature vectors;

(d) identifying candidate negative goals from the plurality of goals;

(e) excluding the candidate negative goals from the plurality of unlabeled goals to obtain a set of unlabeled goals;

(f) classifying the set of unlabeled goals into a plurality of classes by the first classifier and the second classifier, by utilizing a co-training framework for semi-supervised learning based approach and matching the manually created goals with the plurality of template goals, wherein the plurality of labeled goals are constructed automatically using the plurality of template goals for classification;

(g) determining a confidence score associated with the classification of each of the set of unlabeled goals into the plurality of classes;

(h) adding from amongst the set of unlabeled goals, one or more unlabeled goals to the plurality of labeled goals to obtain an updated set of labeled goals, the one or more unlabeled goals associated with a class label for each of the first classifier and the second classifier, the one or more unlabeled goals having the confidence score greater than or equal to a threshold value; and (i) iteratively co-training the first classifier and the second classifier using the updated set of labeled goals for a threshold number of iterations by performing steps of training the first and second classifiers using the updated set of the labeled goals, identifying candidate negative goals, classifying the set of unlabeled goals into the plurality of classes by the first and second classifier, determining the confidence score associated with the classification of each of the set of unlabeled goals into the plurality of classes, and updating the set of labeled goals.

* * * * *